(12) United States Patent
Root et al.

(10) Patent No.: US 7,195,220 B2
(45) Date of Patent: Mar. 27, 2007

(54) SUPPORT ARM FOR STORED DEVICES

(75) Inventors: Paul Root, Bad Endbach (DE); Markus Neuhof, Ehringshausen-Niederlemp (DE)

(73) Assignee: Rittal GmbH & Co. KG, Herborn (DE)

( * ) Notice: Subject to any disclaimer, the term of this patent is extended or adjusted under 35 U.S.C. 154(b) by 58 days.

(21) Appl. No.: 11/004,609

(22) Filed: Dec. 3, 2004

(65) Prior Publication Data

US 2005/0173604 A1    Aug. 11, 2005

(30) Foreign Application Priority Data

Dec. 5, 2003    (DE) ................ 103 57 331

(51) Int. Cl.
  *E04G 3/00*    (2006.01)
(52) U.S. Cl. .............. 248/291.1; 248/292.11; 248/282.12; 248/292.13; 248/292.14; 248/294.1; 248/323; 248/324
(58) Field of Classification Search ........... 248/291.1, 248/288.11, 274.1, 323, 183.2, 178.1, 340, 248/125.9, 121, 314, 289, 224.7, 307, 308, 248/324, 292.11, 292.12, 292.13, 292.14, 248/294.1
See application file for complete search history.

(56) References Cited

U.S. PATENT DOCUMENTS

| | | | | |
|---|---|---|---|---|
| 3,149,811 A | * | 9/1964 | Gorton et al. .............. 248/251 |
| 3,212,740 A | * | 10/1965 | Greenberg ................. 248/514 |
| 4,089,084 A | * | 5/1978 | Droz ............................ 16/357 |
| 4,323,162 A | * | 4/1982 | Steinhilber ................. 211/100 |
| 4,838,440 A | * | 6/1989 | Thompson ................. 248/188 |
| 5,588,630 A | * | 12/1996 | Chen-Chao ................ 248/514 |
| D410,837 S | * | 6/1999 | Vogels ......................... D8/363 |
| D488,705 S | * | 4/2004 | Mendelsohn et al. ....... D8/354 |
| 6,986,489 B2 | * | 1/2006 | Oddsen, Jr. ............ 248/289.11 |
| 7,040,589 B2 | * | 5/2006 | Wang .................... 248/289.11 |

* cited by examiner

*Primary Examiner*—Carl D. Friedman
*Assistant Examiner*—Todd M. Epps
(74) *Attorney, Agent, or Firm*—Pauley Peterson & Erickson

(57) ABSTRACT

A support arm for stored devices, which is pivotably seated in a holder fastened to a fastening surface and can be horizontally adjusted into a pivoted-in position and a pivoted-out position. In the pivoted-in position the support arm extends approximately parallel with the fastening surface and in the pivoted-in position extends perpendicularly with respect to the fastening surface. If the holder is designed as a cup having a front horizontal guide slit facing away from the fastening surface, and a rear horizontal guide slit facing the fastening surface, the support arm is inserted into the two guide slits of the cup and is held therein, and the front guide slit and the rear guide slit limit the pivot movement of the support arm, wherein the front guide slit in the seating wall for the support arm has two receiving grooves, in which the support arm can be brought into the pivoted-in and pivoted-out positions and can be fixed therein without being pivotable, then a pivoted seating without bearing bolts is created and results in defined pivot settings, which improve the operational dependability.

16 Claims, 2 Drawing Sheets

SUPPORT ARM FOR STORED DEVICES

BACKGROUND OF THE INVENTION

1. Field of the Invention

This invention relates to a support arm for stored devices, which is pivotably seated in a holder fastened to a fastening surface and can be horizontally adjusted into a pivoted-in position and a pivoted-out position, wherein in the pivoted-in position the support arm extends approximately parallel with the fastening surface, and in the pivoted-in position extends perpendicularly with respect to the fastening surface.

2. Discussion of Related Art

Various support arms are known, wherein the support arm is rotatably seated in the holder. In this case, the holder can also be embodied as a fastening element, which is fastened to the wall forming the fastening surface. The rotatable seating is provided by bearing bolts and does not provide an unequivocal fixation of the two pivot positions. This includes a danger that the pivoted-out position in particular is not unequivocally secured and can be inadvertently changed. Thus, the stored device can only be stored insufficiently secured on two support arms.

SUMMARY OF THE INVENTION

It is one object of this invention to provide a support arm of the type mentioned above but in which at least the pivoted-in and pivoted-out positions of the support arm are secured and cannot be inadvertently changed.

In accordance with this invention the above object is achieved with a holder designed as a cup having a front horizontal guide slit facing away from the fastening surface, and a rear horizontal guide slit facing the fastening surface. The support arm is inserted into the two guide slits of the cup and is held therein, and the front guide slit and the rear guide slit limit the pivot movement of the support arm, wherein the front guide slit in the seating wall for the support arm has two receiving grooves, in which the support arm can be brought into the pivoted-in and pivoted-out positions and can be fixed therein without being pivotable.

A pivoted seating without bearing bolts is achieved by the two guide slits in the cup, which results in a secure pivoted-in position and pivoted-out position of the support arm with the two receiving grooves in the seating wall. If the two receiving grooves of the front guide slit are separated from each other by a separating strip on the seating wall for the support arm, the width of the front guide slit in the area of or near the separating strip corresponds approximately to the vertical dimension of the support arm, and the width of the rear guide slit is slightly greater than the vertical dimension of the support arm, then pivoting of the support arm into the respectively other end position can only be performed by lifting the support arm. In this case the height of the separating strip determines the lift of the support arm required for this purpose. The vertical dimensions of the guide slits assure that this lift can be performed and that the pivot movement of the support arm is not hindered.

A further advantage of the novel pivoted seating of the support arm is that the support arm is adjustably guided in the guide slits in an axially non-displaceable or limited axially displaceable manner by stops at the ends, wherein the stops at the end of the support arm facing the cup are arranged inside the cup or outside the cup. The projecting length of the support arm can be unchangeable, or can be matched to the depth of the stored device.

Because two support arms are required for the stored device, in one embodiment two different cups are provided, which are designed mirror-reversed and with the guide slits relative to the center planes extending perpendicularly with respect to the fastening surfaces. In this case the two support arms differ by their oppositely directed pivoting-out movements. This can also be achieved with identically designed cups, if the cups are simply fixed in place and rotated by 90° on fastening legs of angled fastening brackets. In this case the fixation in place can occur if the area of the cup bottom of the cup is fixed in a fastening receiver of a fastening leg of a fastening bracket, wherein the other fastening leg extends parallel with the fastening surface. The fastening brackets offer selective attachment if both fastening legs of the fastening bracket have fastening bores, and if the support arms with the fastening bracket are selectively fastened on a horizontal wall of storage device or the like, or on a vertical fastening profile side of a horizontal mounting rail or the like.

BRIEF DESCRIPTION OF THE DRAWINGS

This invention is explained in greater detail in view of exemplary embodiments shown in the drawings, wherein.

DESCRIPTION OF PREFERRED EMBODIMENTS

Figure 1:
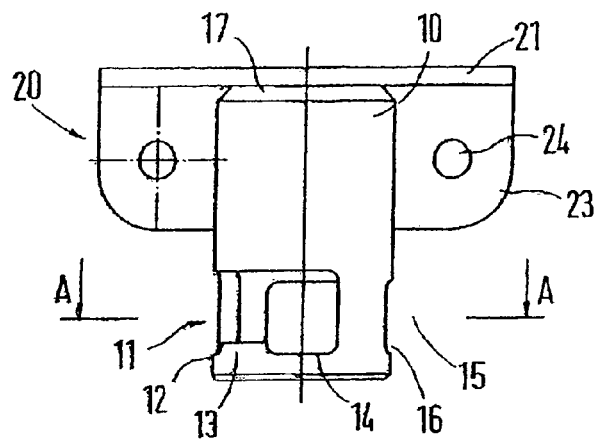
FIG. 1 is a front view of a holder, embodied as a cup with fastening brackets, for a support arm.

The holder shown in FIGS. 1 to 4 has a cup 10 as its base elements which, with a bottom 17, is fixedly connected with a horizontal fastening leg 21 of a fastening bracket 20. The fastening bracket 20 has a second fastening leg 23, which is oriented parallel with respect to the fastening surface from which the supports arms are pivoted, so that they project out perpendicularly. Both fastening legs 21 and 23 have fastening bores 22 and 24. The fastening leg 21 can have a receiver 25, into which a shoulder of the cup bottom 17 is inserted. A rear horizontal guide slit 15 facing the fastening leg 23, i.e. the fastening surface, and a front horizontal guide slit 11 facing away from the fastening surface, are cut into the wall of the cup. The guide slits 11 and 15 form support walls for the support arm in the area of or near the open underside of the cup 10, into which the two guide slits 11 and 15 are inserted. At its end attached to the cup 10, the support arm 30 can have stops, which maintain the support arm 30 in the guide slits 11 and 15, so the support arm can be axially adjusted in a limited way, or can be therein held immovably. This can be obtained if the stop facing the cup 10 is attached to the underside of the support arm 30 on the inside or the outside of the cup 10.

The stops 31 at the front end of the support arm 30 are oriented upward and fix the stored device in place.

Figure 2:
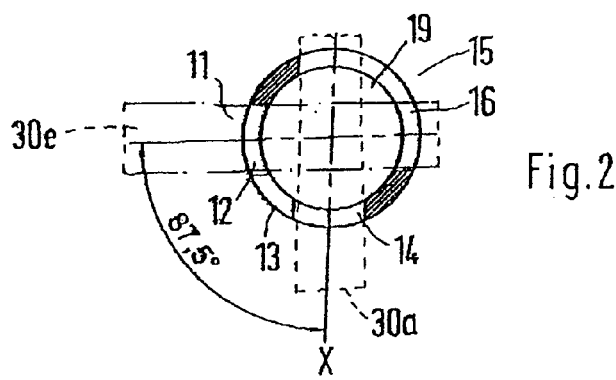
FIG. 2 is a horizontal section taken through the cup along the line A—A as shown in FIG. 1.
Figure 3:
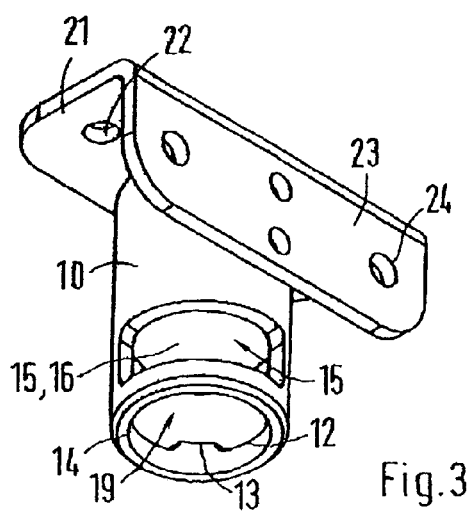
FIG. 3 is a perspective plan view of the holder shown in FIG. 1, in a direction toward a rear guide slit.
Figure 4:
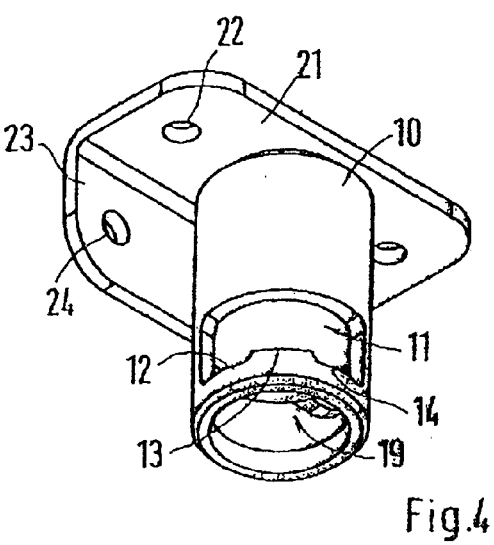
FIG. 4 is a perspective plan view of the holder shown in FIG. 1, in a direction toward a front guide slit.

As shown by the sectional view in FIG. 2, the support arm 30 can assume a pivoted-in position 30e and a pivoted-out position 30a in the guide slits 11 and 15. The guide slit 11 only needs to have a width slightly larger than the corresponding dimension of the support arm 30 which, for example, can be designed as a square hollow profiled section. The vertical ends of the guide slit 15 limit the pivot movement of the support arm 30. The front guide slit 11 forms two receiving grooves 12 and 14 in the support wall, which are separated from each other by a raised separating strip 13. Here, the receiving grooves 12 and 14 are located on a common level with the support wall 16 of the guide slit 15.

Figure 5:
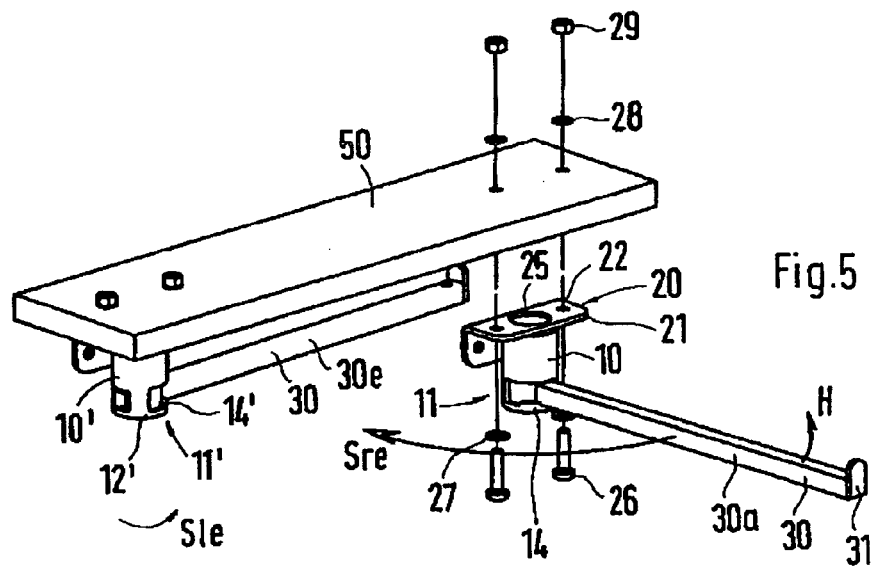
FIG. 5 is a schematic diagram of a storage device having two support arms on a horizontal fastening surface with opposite pivoting-out movements.

In the holder shown in FIG. 1, the support arm 30 can project away toward the left in the pivoted-in position 30e and can be brought into the pivoted-out position 30a, which extends vertically relative to the drawing plane, as shown by the dashed lines in FIG. 2. Pivoting can also occur in the opposite way if the cup 10' in accordance with FIG. 5 is embodied mirror-reversed relative to the center plane x, or is attached rotated by 90° around the vertical center axis. The vertical width of the guide slit 11 over the separating strip 13 must at least correspond to the vertical dimension of the support arm 30, so that the pivot movement is not hindered. With the rotated cup 10', the receiving groove 14' defines the pivoted-in position 30e, which is oriented to the right, and the receiving groove 12' defines the pivoted-out position 30a of the support arm. The pivoting movements Sle and Sre of the stored device in FIG. 5 are oppositely oriented when the support arms 30 are moved from the pivoted-out positions 30a into the pivoted-in positions 30e. This also applies to the opposite pivot movement out of the pivoted-in position 30e into the pivoted-out position 30a. Prior to pivoting of the support arms 30, the support arm 30 must be lifted upward by a lift movement H sufficiently far, so that it can be displaced over the separating strip 13.

Figure 6:
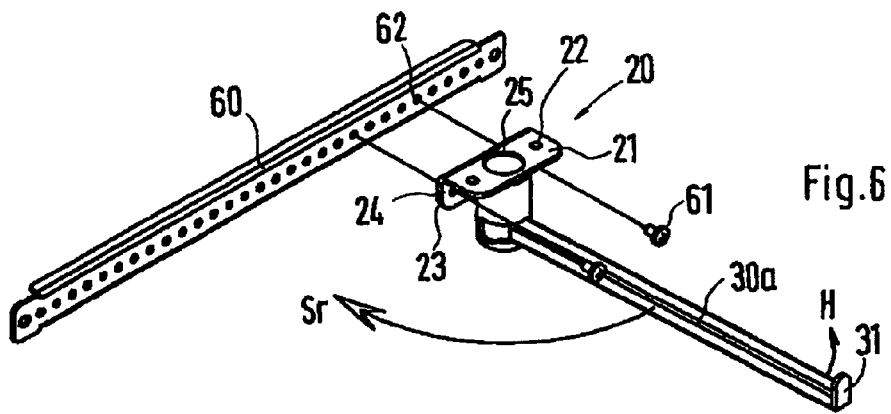
FIG. 6 is a schematic diagram of the application of a support arm on a vertical profiled side of a mounting rail as the fastening surface, which can be arranged horizontally.
Figure 7:
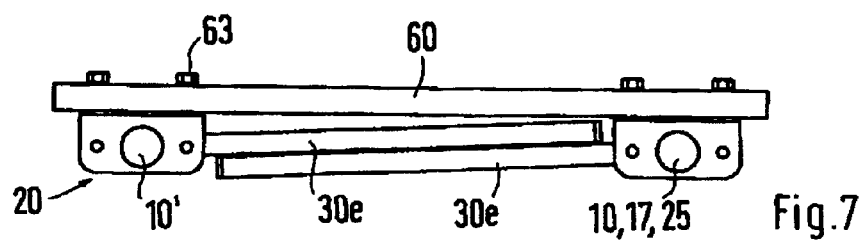
FIG. 7 is a top view on two support arms attached to the mounting rail and pivoted-in in opposite directions.

The two fastening brackets 20 in FIG. 5 are attached to the underside of the stored device 50 forming the horizontal fastening surface by screws 26, washers 27 and 28 and nuts 29. In a similar manner, the fastening brackets 20 can also be attached by screws 61 and nuts 63 to a vertical profiled side 62 of a horizontally seated or seatable mounting rail 60, as shown in FIGS. 6 and 7. In this case the support arms 30, which are pivotable in opposite directions, can be brought into the pivoted-in position 30e facing each other if different cups 10 and 10' are used, or identical cups 10 are fixed on the fastening brackets 20 in different rotatory positions.

German Patent Reference 103 57 331.3, the priority document corresponding to this invention, and its teachings are incorporated, by reference, into this specification.

What is claimed is:

1. A support arm for stored devices, which is pivotably seated in a holder fastened to a fastening surface and horizontally adjustable into a pivoted-in position and a pivoted-out position, wherein in the pivoted-in position the support arm extends approximately parallel with the fastening surface, and in the pivoted-in position the support arm extends approximately perpendicular with respect to the fastening surface, the support arm comprising:

the holder designed as a cup (10) having a front horizontal guide slit (11) facing away from the fastening surface and a rear horizontal guide slit (15) facing the fastening surface;

the support arm (30) inserted into the two guide slits (11, 15) of the cup (10) and held therein; and the front guide slit (11) and the rear guide slit (15) limiting a pivot movement of the support arm (30) and the front guide slit (11) in the seating wall for the support arm (30) having two receiving grooves (12, 14) in which the support arm (30) is movable into the pivoted-in position (30e) and the pivoted-out position (30a) and is fixable therein without being pivotable.

2. The support arm in accordance with claim 1, wherein the two receiving grooves (12, 14) of the front guide slit (11) are separated from each other by a separating strip (13) on the seating wall for the support arm (30), a width of the front guide slit (11) near the separating strip (13) corresponds approximately to the vertical dimension of the support arm (30), and a width of the rear guide slit (15) is slightly greater than a vertical dimension of the support arm (30).

3. The support arm in accordance with claim 2, wherein the support arm (30) is adjustably guided in the guide slits (11, 15) in one of an axially non-displaceable manner and a limited axially displaceable manner by stops at ends of the support arm (30), and the stops at an end of the support arm (30) facing the cup (10) are arranged on an underside of the support arm (30) one of inside the cup (10) and outside the cup (10).

4. The support arm in accordance with claim 2, further comprising two different cups (10, 10') that are designed mirror-reversed with the guide slits (11, 15) relative to a center plane (x) extending perpendicularly to the fastening surfaces.

5. The support arm in accordance with claim 4, wherein near a bottom (17) of the cup (10), the cup (10) is fixed in a fastening receiver (25) of a fastening leg (21) of a fastening bracket (20), and an other fastening leg (23) extends parallel with the fastening surface.

6. The support arm in accordance with claim 5, wherein the two cups (10, 10') are fixed in place and rotated by 90° on fastening legs (21) of fastening brackets (20).

7. The support arm in accordance with claim 6, wherein the fastening legs (21, 23) of the fastening bracket (20) have fastening bores (22, 24).

8. The support arm in accordance with claim 7, wherein the fastening brackets (20) are selectively fastenable on one of a horizontal wall of the storage device (50) and a vertical fastening profile side of a horizontal mounting rail (60).

9. The support arm in accordance with claim 8, wherein an upward oriented stop (31) for fixing the stored device in place is provided at a front end of the support arm (30).

10. The support arm in accordance with claim 1, wherein the support arm (30) is adjustably guided in the guide slits (11, 15) in one of an axially non-displaceable manner and a limited axially displaceable manner by stops at ends of the support arm (30), and the stops at an end of the support arm (30) facing the cup (10) are arranged on an underside of the support arm (30) one of inside the cup (10) and outside the cup (10).

11. The support arm in accordance with claim 1 , further comprising two different cups (10, 10') that are designed mirror-reversed with the guide slits (11, 15) relative to a center plane (x) extending perpendicularly to the fastening surfaces.

12. The support arm in accordance with claim 1, wherein near a bottom (17) of the cup (10), the cup (10) is fixed in a fastening receiver (25) of a fastening leg (21) of a fastening bracket (20), and an other fastening leg (23) extends parallel with the fastening surface.

13. The support arm in accordance with claim 4, wherein the two cups (10, 10') are fixed in place and rotated by 90° on fastening legs (21) of fastening brackets (20).

14. The support arm in accordance with claim 4, wherein the fastening legs (21, 23) of the fastening bracket (20) have fastening bores (22, 24).

15. The support arm in accordance with claim 1, wherein the cup (10) comprises a fastening bracket (20) that is selectively fastenable on one of a horizontal wall of the storage device (50) and a vertical fastening profile side of a horizontal mounting rail (60).

16. The support arm in accordance with claim 1, wherein an upward oriented stop (31) for fixing the stored device in place is provided at a front end of the support arm (30).

* * * * *